(12) United States Patent
Wickstone

(10) Patent No.: US 8,272,368 B2
(45) Date of Patent: Sep. 25, 2012

(54) DUAL FUEL CONNECTOR

(75) Inventor: Michael C. Wickstone, Richmond (CA)

(73) Assignee: Westport Power Inc., Vancouver, British Columbia (CA)

( * ) Notice: Subject to any disclaimer, the term of this patent is extended or adjusted under 35 U.S.C. 154(b) by 0 days.

(21) Appl. No.: 12/971,703

(22) Filed: Dec. 17, 2010

(65) Prior Publication Data

US 2011/0108004 A1 May 12, 2011

Related U.S. Application Data

(63) Continuation of application No. PCT/CA2009/000591, filed on Apr. 30, 2009.

(51) Int. Cl.
*F02M 55/02* (2006.01)
(52) U.S. Cl. ........................................ 123/468; 123/469
(58) Field of Classification Search .................. 123/468, 123/469, 525, 575; 285/120.1, 124.1
See application file for complete search history.

(56) References Cited

U.S. PATENT DOCUMENTS

| | | | | |
|---|---|---|---|---|
| 1,871,340 A | * | 8/1932 | Pielstick | 137/315.09 |
| 3,421,702 A | * | 1/1969 | O'Brien | 239/418 |
| 3,845,748 A | | 11/1974 | Eisenberg | |
| 3,977,367 A | * | 8/1976 | Roberts | 123/206 |
| 4,485,790 A | | 12/1984 | Nishimura et al. | |
| 4,693,227 A | | 9/1987 | Satou | |
| 4,705,010 A | | 11/1987 | Baranescu | |
| 4,708,371 A | * | 11/1987 | Elsworth et al. | 285/13 |
| 5,076,242 A | * | 12/1991 | Parker | 123/514 |
| 5,239,964 A | * | 8/1993 | Diener et al. | 123/456 |
| 5,365,907 A | | 11/1994 | Dietrich et al. | |
| 5,404,711 A | | 4/1995 | Rajput | |
| 5,438,966 A | | 8/1995 | Teegen | |
| 5,450,832 A | * | 9/1995 | Graf | 123/515 |
| 5,617,828 A | | 4/1997 | Kuegel et al. | |
| 5,775,303 A | | 7/1998 | Sweetland et al. | |
| 5,816,224 A | * | 10/1998 | Welsh et al. | 123/525 |

(Continued)

FOREIGN PATENT DOCUMENTS

EP 0569727 11/1993

OTHER PUBLICATIONS

Office Action issued on Nov. 4, 2008 in connection with Canadian Patent Application No. 2,365,410.

(Continued)

*Primary Examiner* — Thomas Moulis
(74) *Attorney, Agent, or Firm* — Corridor Law Group, P.C.; Robert W. Fieseler

(57) ABSTRACT

A dual fuel connector separately supplies two different fuels to fluidly isolated fuel passages within a fuel injection valve of an internal combustion engine. The dual fuel connector comprises a body with separate fluid connections to the first fuel inlet, the second fuel inlet, a first fuel rail and a second fuel rail. A first fuel passage within the body is in fluid communication with the first fuel rail and the first fuel inlet. A second fuel passage within the body is in fluid communication with the second fuel rail and the second fuel inlet, and wherein the first fuel passage is fluidly isolated from the second fuel passage. The dual fuel connector supplies two different fuels to a fuel injection valve, for engines that are not designed with a cylinder head that has internal bores that can serve as fuel rails.

25 Claims, 7 Drawing Sheets

U.S. PATENT DOCUMENTS

| | | | |
|---|---|---|---|
| 5,979,410 | A | 11/1999 | Grieshaber |
| 5,996,558 | A | 12/1999 | Ouellette et al. |
| 6,067,964 | A | 5/2000 | Ruoff et al. |
| 6,073,862 | A | 6/2000 | Touchette et al. |
| 6,237,570 | B1 | 5/2001 | Aoki et al. |
| 6,279,540 | B1 | 8/2001 | Greaney et al. |
| 6,298,833 | B1 | 10/2001 | Douville et al. |
| 6,336,598 | B1 | 1/2002 | Touchette et al. |
| 6,431,150 | B1 | 8/2002 | Pearlman et al. |
| 6,431,471 | B2 * | 8/2002 | Anzinger et al. .......... 239/585.1 |
| 6,439,192 | B1 | 8/2002 | Ouellette et al. |
| 6,536,417 | B2 | 3/2003 | Pearlman et al. |
| 6,550,815 | B2 * | 4/2003 | Zitkowic et al. ........... 285/120.1 |
| 6,588,406 | B2 * | 7/2003 | Oprea ........................... 123/525 |
| 6,604,509 | B1 * | 8/2003 | Hegner ........................ 123/456 |
| 6,761,325 | B2 | 7/2004 | Baker et al. |
| 6,802,539 | B2 * | 10/2004 | Cooke et al. ................ 285/124.1 |
| 6,827,065 | B2 * | 12/2004 | Goetzke et al. ................ 123/456 |
| 7,305,830 | B2 * | 12/2007 | Fish ................................. 60/739 |
| 2007/0125338 | A1 * | 6/2007 | Kato et al. .................... 123/304 |
| 2007/0241560 | A1 * | 10/2007 | Malone ......................... 285/319 |
| 2009/0255602 | A1 * | 10/2009 | McMasters et al. .......... 138/115 |
| 2011/0017174 | A1 * | 1/2011 | Ulrey et al. ................... 123/456 |

OTHER PUBLICATIONS

International Search Report and Written Opinion of the International Searching Authority issued on Jul. 17, 2009 in connection with International Application No. PCT/CA2009/00591.

International Preliminary Report on Patentability issued on Sep. 8, 2010 in connection with International Application No. PCT/CA2009/00591.

* cited by examiner

DUAL FUEL CONNECTOR

CROSS-REFERENCE TO RELATED APPLICATION(S)

This application is a continuation of International Application No. PCT/CA2009/000591, having an international filing date of Apr. 30, 2009, entitled "Dual Fuel Connector". The '591 international application claimed priority benefits, in turn, from Canadian Patent Application No. 2,635,410 filed Jun. 19, 2008. The '591 international application is hereby incorporated by reference herein in its entirety.

FIELD OF THE INVENTION

The present invention relates to a dual fuel connector for supplying two different fuels to separate fuel passages in a fuel injection valve for an internal combustion engine. The invention is particularly suited to an arrangement where the two fuels are each supplied under high pressure and the fuel injection valve is located within a first bore provided in an engine cylinder head with the dual fuel connector located within a second bore provided in the engine cylinder head with the second bore intersecting with the first bore.

BACKGROUND OF THE INVENTION

With governments and governmental agencies imposing increasingly lower emissions limits from internal combustion engines, attention has been directed to a number of strategies for reducing emissions of regulated combustion by-products, such as particulate matter (also known as soot), nitrous oxides (NOx) and other greenhouse gases. One strategy has been to improve the efficiency and quality of combustion for engines fuelled with conventional liquid fuels, to reduce the amount of such emissions produced by combustion and to add exhaust treatment systems such as catalytic converters and filters, to trap certain combustion products and reduce the amounts of such emissions that are ultimately released into the environment. For example, particulate filters can trap particulate matter and catalytic exhaust treatment systems can convert greenhouse gases into benign substances such as elemental nitrogen and oxygen. Recent increases in global oil prices make conventionally fuelled engines more costly to operate.

Another strategy is to substitute most or all conventional liquid fuel with a cleaner burning gaseous fuel such as, for example, methane, ethane, propane, lighter flammable hydrocarbon derivatives, hydrogen, or natural gas or other blends usable as a gaseous fuel. In addition to being cleaner burning, many of these fuels can be generated from renewable sources. When substituting a cleaner burning gaseous fuel for most of the fuel, a small amount of liquid fuel can be used as a pilot fuel, for assisting with ignition of the gaseous fuel, as well as for lubrication and cooling in the injection valve. A challenge associated with this approach is that it requires the supply of two different fuels to the fuel injection valves.

Fuel injection valves for injecting a single fuel directly into a combustion chamber are well known. There are a number of known arrangements for supplying a single fuel to an injection valve. For example, a bore formed in the cylinder head can serve as a fuel rail for delivering high pressure fuel directly to the injection valve. In another embodiment, piping external to the cylinder head can serve as the fuel rail, and such piping can be connected to an inlet into the fuel injection valve where it protrudes above the cylinder head. In still other arrangements, fuel is delivered through a fuel rail provided by piping external to the cylinder head, and high pressure fuel is delivered to the fuel injection valve via a fuel connector that extends through a bore in the cylinder head. An advantage of this last arrangement is that fuel that leaks from the fuel connector is kept away from the cylinder head cover where it might contaminate the lubrication oil.

To reduce the development cost of producing an engine that is fuelled with a gaseous fuel and a different pilot fuel, dual fuel injection valves have been developed that can fit within the bore normally occupied by a conventional single-fuel injection valve. For example, such valves are disclosed in co-owned U.S. Pat. Nos. 5,996,558, 6,073,862, 6,298,833, 6,336,598, 6,439,192, and 6,761,325. This avoids the time and cost associated with developing a custom cylinder head that might otherwise be needed to supply two different fuels to an engine, and because no modifications are needed to the cylinder head it can be manufactured at the same cost as the mass produced cylinder heads that are made for engines fuelled with conventional liquid fuels. In preferred embodiments the two fuels are delivered to the fuel injection valve separately. An advantage of delivering the fuels separately to the fuel injection valve is that the fuel proportions can be adjusted depending upon engine operating conditions. The fuels can either be mixed inside the injection valve or injected separately into the engine combustion chamber. An additional advantage of injecting the fuel separately is that greater flexibility is possible with respect to the timing for the injection of each fuel and this is a variable that can be manipulated to improve combustion quality.

The applicant has developed dual fuel injection valves for a Cummins™ model ISX engine which has formed within its cylinder head three bores associated with each bank of cylinders, two of which can be utilized as high pressure fuel supply rails for supplying two separate fuels under high pressure to the fuel injection valves. The third bore can be used to drain hydraulic fluid from hydraulic actuators. However, unlike the model ISX engine, many other engines are designed to use external piping for supplying fuel to the fuel injection valves so they do not have bores provided within their cylinder heads that can serve as fuel rails. For these engines a problem with delivering two fuels to fuel injection valves using external piping is that the additional piping associated with the second fuel rail adds complexity and there are spatial limitations for the piping and the connections between the fuel rail and the fuel injection valves. In addition, as mentioned already with respect to the fuel injection valves, it is desirable to reduce or obviate the need for modifications to the cylinder head.

Accordingly, there is a need for an arrangement for supplying two different fuels to a fuel injection valve, for engines that are not designed with a cylinder head that has internal bores that can serve as fuel rails. In addition, it would be advantageous if the two different fuels can be delivered to fuel injection valves from two fuel rails that are external to the cylinder head without requiring substantial modifications to the cylinder head.

SUMMARY OF THE INVENTION

A dual fuel connector is disclosed for separately supplying two different fuels to a fuel injection valve, namely a first fuel that is supplied to a first fuel inlet into the fuel injection valve and a second fuel that is supplied to a second fuel inlet into the fuel injection valve. The dual fuel connector comprises a body with separate fluid connections to the first fuel inlet, the second fuel inlet, a first fuel rail and a second fuel rail. A first fuel passage within the body is in fluid communication with the first fuel rail and the first fuel inlet. A second fuel passage within the body is in fluid communication with the second fuel rail and the second fuel inlet. The first fuel passage is fluidly isolated from the second fuel passage. Accordingly, the dual fuel connector simplifies piping to the fuel injection valve from the fuel rails by eliminating the need for connections from the two fuel rails directly to the fuel injection valve, and this also facilitates installation and removal of the fuel injection valve since the connections between the fuel rails and the dual fuel connector do not need to be undone when installing or removing the fuel injection valve. By delivering the two fuels to the fuel injection valve separately, the disclosed dual fuel connector also allows the possibility of improving engine performance and combustion efficiency by permitting greater flexibility in controlling the proportion of each fuel that is delivered to the combustion chamber and the timing for introducing each fuel into the combustion chamber, depending upon the capabilities of the fuel injection valve.

In a preferred embodiment the body of the dual fuel connector is elongated with a proximal end associated with the fuel injection valve and a distal end associated with the first and second fuel rails. In some embodiments the elongated body of the dual fuel connector is mountable in a first bore provided in the cylinder head that intersects with a second bore provided in the cylinder head in which the fuel injection valve is mountable. The body can comprise a central bore that defines the first fuel passage and the second fuel passage can be defined by an annular space around the central bore with a wall separating the first and second fluid passages, and in such embodiments the wall separating the first and second fluid passages can be tubular. An advantage of an arrangement with concentric fluid passages is that while the wall separating the first and second fluid passages is made with a thickness that is selected to withstand differential pressures between the first fuel and the second fuel without rupturing or deflecting to a degree that the flow of the first or second fuels is affected, this thickness can be less than what is needed to withstand rupture against a designed maximum gauge pressure of the second fuel. This is because the differential pressure acting on the wall is much less than the gauge pressure of either one of the two fuels, so the separating wall is not subjected to the entire gauge pressure. Accordingly, the disclosed arrangement with concentric fluid passages can allow the separating wall to be thinner, which can allow the overall cross sectional diameter of the dual fuel connector to be smaller.

In a preferred embodiment the first fuel is a gaseous fuel and the second fuel is a liquid fuel. Compared to the liquid fuel, the gaseous fuel can be a cleaner burning fuel that does not ignite as easily as the liquid fuel. By burning mostly gaseous fuel, engine emissions can be improved and a small amount of liquid fuel can be injected to assist with at least one of cooling, lubrication within the fuel injection valve, and ignition of the gaseous fuel.

When the second fuel is a liquid fuel and the fuel injection valve is hydraulically actuated, the liquid fuel can be used as the hydraulic fluid for the actuator. Accordingly, the apparatus can further comprise an opening between the second fuel passage and a hydraulic fluid passage within the fuel injection valve that communicates with a control chamber of a hydraulic actuator.

A number of different arrangements are disclosed for sealing between the dual fuel connector and the fuel injection valve. In one embodiment the proximal end of the body comprises a seating surface that is contactable with an opposing metal seat provided on the fuel injection valve to form a fluid tight seal when the body is urged against the fuel injection valve. The fluid tight seal can define a boundary between the first fuel inlet and the second fuel inlet. The seating surface of the proximal end of the body can be shaped to be semi-spherical or semi-spheroidal. The metal seat on the fuel injection valve, which interfaces with the proximal end of the dual fuel connector can be conically shaped. In another embodiment the fluid tight seal is provided by resilient ring seal members positioned between the body and opposing surfaces associated with the fuel injection valve and/or the cylinder head.

The fuel injection valve can be equipped with drain passages for collecting fuel that leaks past seals or fluid that is drained from the control chamber of a hydraulically actuated fuel injection valve. The dual fuel connector can further comprise a drain passage disposed within its body with this drain passage in fluid communication with a drain outlet from the fuel injection valve and a drain line, wherein the drain passage is fluidly isolated from the first and second fuel passages. The drain passage associated with the dual fuel connector can be defined within it or the drain passage can be defined between the outer surface of the dual fuel connector and outer surfaces of the fuel injection valve or cylinder head.

In another preferred embodiment the dual fuel connector has a body that is shaped to fit around the fuel injection valve above the cylinder head or partly above the cylinder head and partly recessed therein.

A method is also disclosed of separately supplying a first fuel and a different second fuel to a fuel injection valve. The method comprises conveying the first and second fuels from separate fuel rails to the fuel injection valve through fluidly isolated first and second fuel passages provided within a body of a dual fuel connector.

The method can further comprise controlling pressures of the first and second fuels so that a pressure differential therebetween within the body is kept below a predetermined value; and, making a wall that separates the first fuel passage from the second fuel passage strong enough to withstand the pressure differential without rupturing or deflecting to a degree that flow of the first or second fuels is affected, with this wall also having a strength that is less than the strength needed to withstand the designed maximum gauge pressure of either one of the first and second fuels. By delivering two fuels separated by the wall, and maintaining the pressure differential between the fuels below a predetermined limit, the separating wall is subjected only to the differential pressure and not subjected to the full individual gauge pressure of each fuel.

In a preferred embodiment of the disclosed method the first fuel is a gaseous fuel and the second fuel is a liquid fuel and the pressure differential between the first fuel and the second fuel is maintained so that when the two fuels are being supplied to the fuel injection valve, the liquid fuel is at a higher pressure than the gaseous fuel.

In another aspect of the preferred method, when one of the fuels is a liquid fuel, and the fuel injection valve is hydraulically actuated, the method can further comprise using the liquid fuel as hydraulic fluid in a control chamber associated with a valve needle and draining the liquid fuel from the control chamber through a drain passage defined at least in part by the body of the dual fuel connector.

Also disclosed is a method of installing a dual fuel connector that comprises an elongated body with a first fuel passage through which a first fuel can be conveyed from a first fuel rail to a first fuel inlet into a fuel injection valve, and a second fuel passage through which a second fuel can be separately conveyed from a second fuel rail to a second fuel inlet into the fuel injection valve. The installation method comprises inserting a proximal end of the body into an opening in a cylinder head, aligning a first opening in the proximal end that is in communication with the first fuel passage with the first fuel inlet and providing a fluidly sealed connection thereto and then aligning a second opening in the proximal end that is in communication with second fuel passage with the second fuel inlet and providing a fluidly sealed connection thereto. The installation method further comprises; at a distal end of the body, connecting the first fuel passage to the first fuel rail and the second fuel passage to the second fuel rail.

Another method of installing a dual fuel connector is also disclosed. In this method the dual fuel connector also comprises a body with a first fuel passage through which a first fuel can be conveyed from a first fuel rail to a first fuel inlet into a fuel injection valve, and a second fuel passage through which a second fuel can be separately conveyed from a second fuel rail to a second fuel inlet into the fuel injection valve, but this method comprises placing the dual fuel connector body on top of the cylinder head with an opening through the body aligned with a bore into which the fuel injection valve is mountable; mounting the injection valve in the bore by inserting it through the body and aligning a first opening in the body that is in communication with the first fuel passage with the first fuel inlet and providing a fluidly sealed connection thereto, and aligning a second opening in the body that is in communication with the second fuel passage with the second fuel inlet and providing a fluidly sealed connection thereto; connecting the first fuel passage to the first fuel rail; and connecting the second fuel passage to the second fuel rail.

All of the figures are drawn schematically to illustrate the features of the disclosed developments, but the shown embodiments are not drawn to scale. For example, the cylinder heads in FIGS. 1-5 can be thicker, for example to accommodate cavities for the cooling jacket, and in such cases the fuel connectors can be more elongated to extend through the cylinder head. Like numbered components and features on different figures that are identified by reference numbers separated by increments of one hundred indicate components in different embodiments that are similar in function and/or form.

DETAILED DESCRIPTION OF PREFERRED EMBODIMENT(S)

Figure 1:
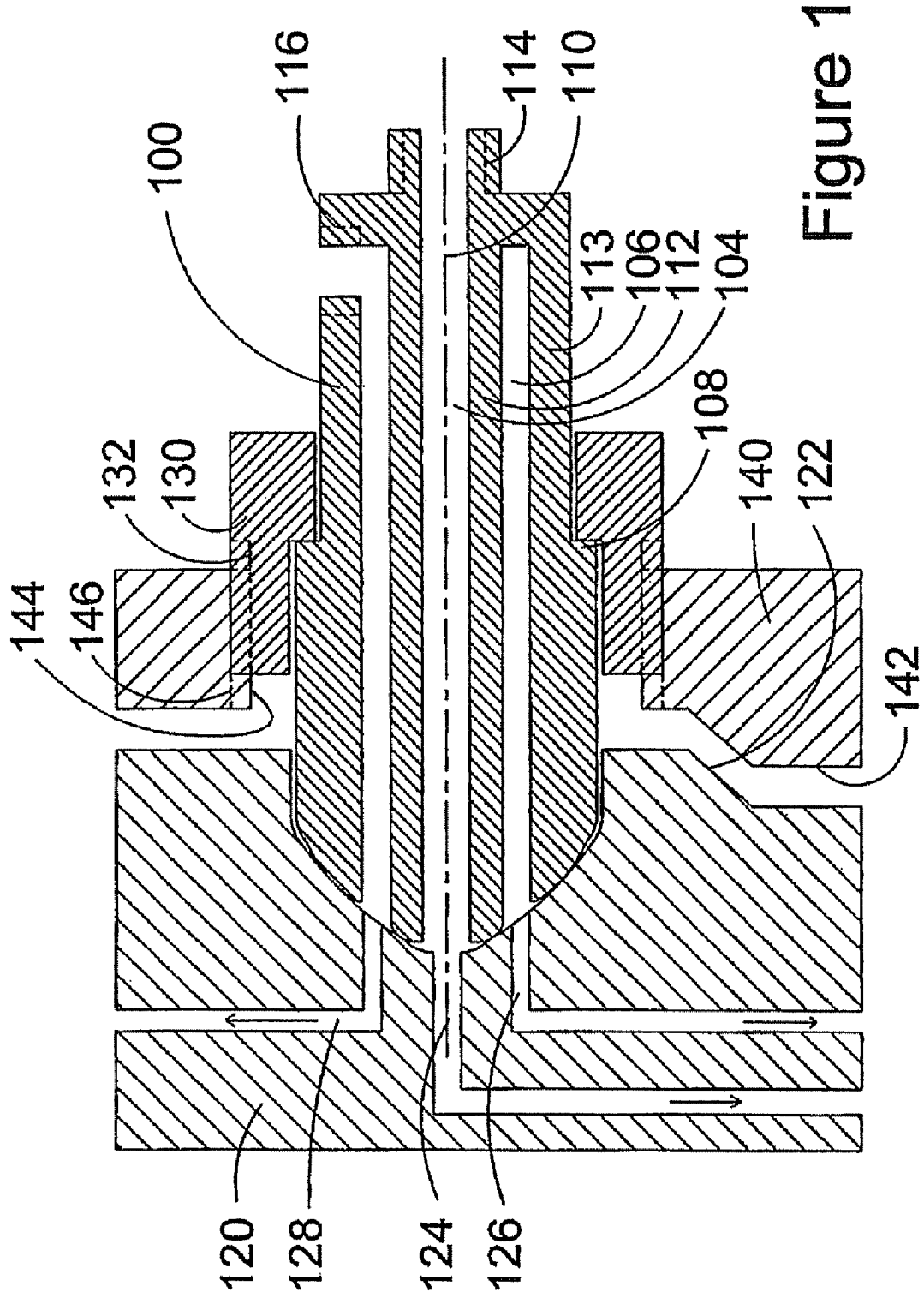
FIG. 1 is a schematic cross section view of part of a fuel injection valve, part of a cylinder head of an internal combustion engine, and a dual fuel connector.

FIG. 1 shows a cross section side view of dual fuel connector 100 and a partial section view of fuel injection valve 120 at a location where the proximal end of dual fuel connector 100 is sealable against it. Common to all embodiments, dual fuel connector 100 comprises one body that provides first fuel passage 104 and second fuel passage 106 for separately delivering two different fuels to fuel injection valve 120. A central bore through the body of dual fuel connector 100 defines first fuel passage 104 and an annual space between separating wall 112 and outside wall 112 defines second fuel passage 106. Accordingly, separating wall 112, which is generally cylindrical and hollow in shape separates first fuel passage 104 from second fuel passage 106. An advantage of this arrangement is that separating wall 112 need only be designed to withstand the differential pressure between the two fuels and the compressive force transmitted through the body to seal against fuel injection valve 120. Separate fuel connectors would each need to be designed with walls strong enough to contain the gauge pressure of the respective fuels since the pressure outside the fuel connector is ambient pressure. That is, if the fuel system is designed to deliver the two fuels with equal pressures or a small pressure differential, this means that separating wall 112 can be constructed with a strength and thickness that is less than outside wall 113. This helps to reduce the overall cross sectional diameter of the dual fuel connector and this is advantageous if the dual fuel connector is designed to fit into an opening that normally receives a single fuel connector. Another advantage of the disclosed arrangement is that there can be some amount of heat transfer between the first fuel and the second fuel through separating wall 112, helping to reduce the temperature differential between the two fuels. Heat transfer may be minimal when the two fuels are flowing, but between fuel injection events, fuel flow can be nil or much reduced while recharging the fuel chambers inside fuel injection valve 120 immediately after an injection event. Making separating wall 112 thinner can help to improve heat transfer between the two different fuels.

FIG. 1 also includes a partial section view of cylinder head 140, showing where dual fuel connector 100 passes through it. The opening through cylinder head 140 is larger than the diameter of dual fuel connector 100 and the opening can be tapped to provide a threaded connection indicated by dashed lines 146, for receiving collar 130 which has a matching threaded section indicated by dashed lines 132. By screwing collar 130 into cylinder head 140, the proximal end of dual fuel connector 100 is urged towards fuel injection valve 120. Opposite sealing surfaces associated with dual fuel connector 100 and fuel injection valve 120, when urged together, cooperate to provide a fluid tight seal that keeps the first fuel delivered through first fuel passage 104 separate from the second fuel that is delivered through second fuel passage 106. The fluid tight seal between fuel connector 100 and fuel injection valve 120 can be made by metal-to-metal contact as shown in FIG. 1. To improve or facilitate sealing many known techniques can be employed. For example, the smoothness of the seating surfaces can be made to a predetermined specification for better sealing, a deformable seat can be made by using a deformable gasket or by making the fuel connector from a material that is softer than the fuel injection valve, or resilient seals can disposed at the sealing surfaces.

In the illustrated embodiment, dual fuel connector 100 is shown with annular shoulder 108 for engaging with collar 130. With two different fuels, the distal end of dual fuel connector 100, which extends from cylinder head 140, comprises two separate fuel connections external to cylinder head 140 and collar 130 allows the orientation of dual fuel connector 100 and the orientation of its connection points to be fixed while collar 130 is tightened, facilitating the connection of dual fuel connector 100 with the fuel rails which deliver the two different fuels from the separate fuel stores. At the distal end, the opening into first fuel passage 104 can comprise a threaded extension indicated by dashed lines 114 for connecting tubing or piping from a first fuel rail (not shown) for delivering the first fuel, and similarly, the opening into second fuel passage 106 can comprise a tapped bore indicated by dashed lines 116 for connecting tubing or piping from a second fuel rail (not shown) for delivering the second fuel. Persons familiar with the technology involved here, with the benefit of this disclosure, will understand that the disclosed threaded collar and threaded couplings are illustrative examples, and that other types of mounting methods and couplings, such as clamps and compression fittings, could be used for respectively mounting dual fuel connector 100 or connecting piping, tubing or hoses from the respective fuel rails to fuel connector 100.

In the side view of FIG. 1, centerline 110 indicates the longitudinal axis of dual fuel connector 100. In the shown embodiments, the dual fuel connector preferably has a body that is generally cylindrical in shape. First fuel passage 104 is aligned with an opening into first fuel inlet 124, for receiving the first fuel into fuel injection valve 120. Second fuel passage 106 is aligned with an opening into second fuel inlet 126, for receiving the second fuel into fuel injection valve 120. When the second fuel is a liquid fuel, second fuel passage 106 can also be aligned with an opening into hydraulic fluid passage 128 which conveys the second fuel to a control chamber so that the second fuel can be used as a hydraulic fluid for hydraulically actuating fuel injection valve 120. Fuel injection valves can be actuated by non-hydraulic actuators, such as electromagnetic, piezoelectric, and magnetostrictive actuators, and hydraulic fluid passage 128 is not needed if the fuel injection valve is not hydraulically actuated or if a hydraulic fluid different from the second fuel is employed.

Fuel injection valve 120 is mounted in first bore 142 which is formed in cylinder head 140 with a vertically oriented longitudinal axis in the schematic view of FIG. 1, which shows a partial section of fuel injection valve 120 and only one side of first bore 142. Fuel injection valve 120 typically has a circular cross-sectional shape in plan view (in a plane perpendicular to the longitudinal axis of first bore 142). First bore 142 has a vertically oriented longitudinal axis in the view shown in FIG. 1, and the diameter of first bore 142 can be stepped to accommodate and receive the shape of fuel injection valve 120 which can have a body that has a diameter that steps down to progressively smaller diameters closer to the nozzle. That is, the body of fuel injection valve 100 can comprise sections with different diameters separated as shown for example in FIG. 1, by shoulder portion 122. Clamps are commonly used to hold fuel injection valves in place.

In the embodiment illustrated by FIG. 1, the opening in the cylinder head through which dual fuel connector 100 extends is formed by second bore 144. While second bore 144 is shown in this embodiment with a constant bore diameter, when the depth of the cylinder head at this location is greater, the diameter of second bore 144 can also be stepped to follow the profile of dual fuel connector 100. That is second bore 144 can comprise one section 146 with one diameter where it is tapped, and then extend from the tapped section towards first bore 142 with a smaller diameter that is closer to the diameter of dual fuel connector 100. Reducing the diameter of second bore 144 can help to improve the strength of the cylinder head and can help to improve the flow of cooling fluid through hollow cavities in water cooled cylinder heads, thereby helping to make the temperature more even in the cylinder head.

When one of the two fuels is a gas and the other fuel is a liquid, in addition to the aforementioned benefits of being able to control the proportion of fuels and the timing for injecting each fuel, it can also be advantageous to deliver the two different fuels to the fuel injection valve separately if the liquid fuel is employed also as a hydraulic fluid that is delivered to a control chamber for actuating the fuel injection valve. The liquid fuel can not be employed as a hydraulic fluid if it is vaporized and port injected or premixed with the gaseous fuel before it is delivered to the fuel injection valve. There are different designs for fuel injection valves that inject two different fuels directly into a combustion chamber and many of them can benefit from a dual fuel connector that delivers the two different fuels separately. For example, some fuel injection valves can premix two different fuels internally within a chamber form inside the fuel injection valve body, other fuel injection valves can mix the two fuels during injection events, and still other fuel injection valves can inject the two different fuels separately. In all of these arrangements to achieve the full benefit of such designs it is necessary to deliver the two fuels to the fuel injection valve separately. When the two fuels are premixed, in order to have control over the fuel mixture by controlling the amount of one fuel that is metered into the other fuel it is necessary to deliver the two fuels to the fuel injection valve separately. It is necessary to deliver and keep the two fuels separate until the injection event if one fuel is mixed or entrained into the other fuel as it is injected. Finally, it is also necessary to deliver and keep the two fuels separate within the body of the fuel injection valve if the two fuels are injected into the combustion chamber independently and separately. For example, some fuel injection valves employ two needles, with each needle associated with its own set of orifices, and each needle can be actuated independently from the other needle to allow complete control over the timing and quantity of each fuel that is injected. In preferred embodiments, fluid passages provided within the body of fuel injection valve 120 define boundaries that keep the first and second fuels separate until the two fuels are premixed within the body of fuel injection valve 100, or until the two fuels are injected from the nozzle of injection valve 100, through separate orifices, or through the same orifices, separately or together. Dual fuel connector 100 simplifies the piping required to separately deliver two different fuels to the fuel injection valve. A common benefit to all of these arrangements is that the engine can be designed with greater flexibility in controlling the proportion of the two fuels and the timing for injecting each one of the two fuels, to adjust for different operating conditions. Such adjustments can help to improve combustion quality which can improve engine performance and efficiency, which can also reduce emissions compared to an engine without the same flexibility.

Figure 2:
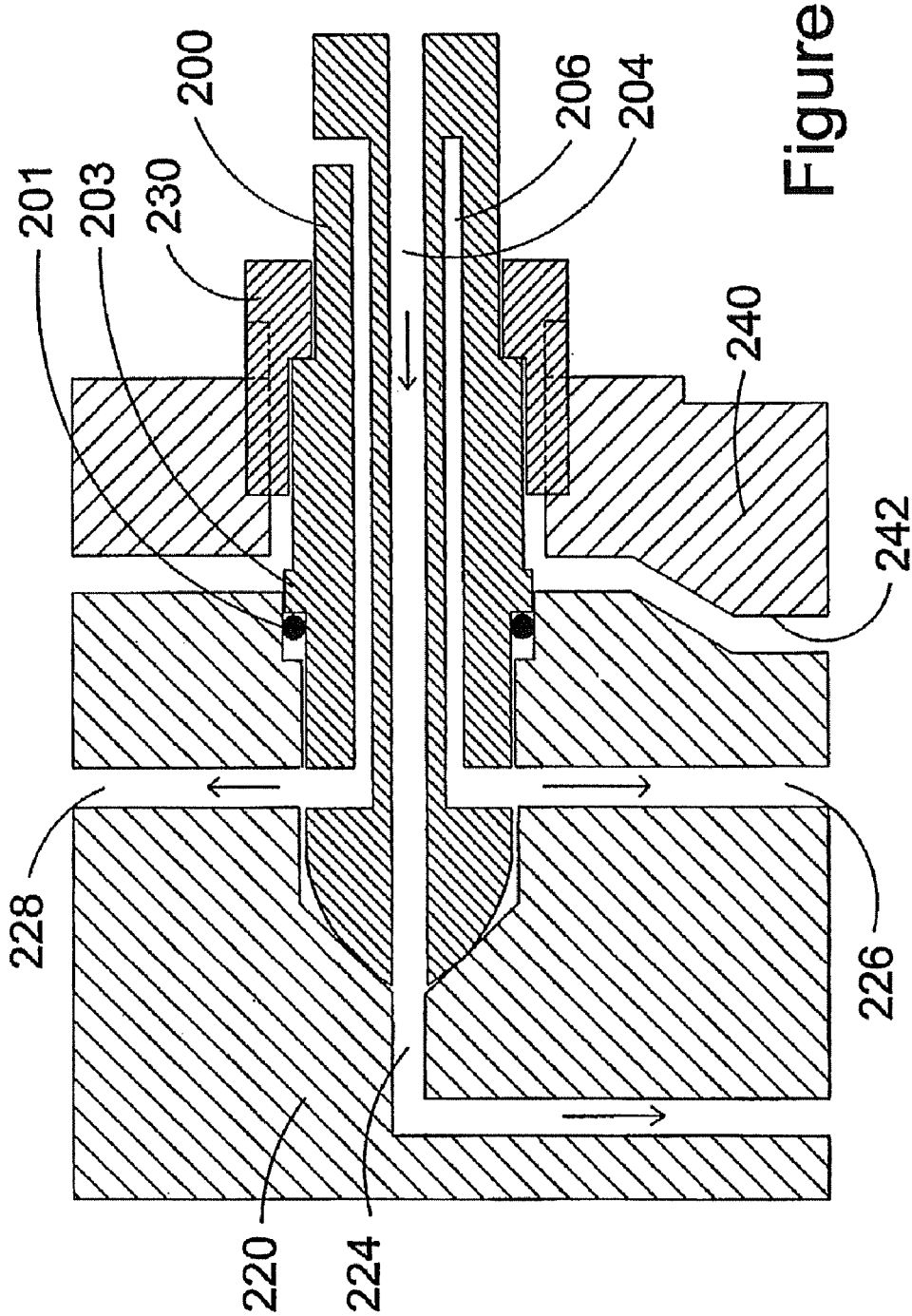
FIG. 2 is a schematic cross section view similar to that of FIG. 1, but with a second embodiment of a dual fuel connector.

FIG. 2 shows a second embodiment of a dual fuel connector. Dual fuel connector 200 comprises first fuel passage 204 and second fuel passage 206 for separately supplying two different fuels to fuel injection valve 220. First fuel passage 204 is aligned with first fuel inlet 224. In the illustrated embodiment, the second fuel is a liquid fuel and fuel injection valve 220 is hydraulically actuated, so second fuel passage 204 has transverse outlet openings aligned with second fuel inlet 226 and hydraulic fluid passage 228. These transverse outlet openings in dual fuel connector 200 are aligned with second fuel inlet 226 and hydraulic fluid passage 228 and are preferably formed by transverse bores through outer wall 213. Because dual fuel connector 200 is held in compression to seal against fuel injection valve 220, the transverse bore openings that connect to second fuel passage 206 to passages inside fuel injection valve 220 leave most of the cross-sectional area of dual fuel connector 200 a solid which helps to resist buckling when dual fuel connector 200 is compressed between fuel injection valve 220 and collar 230.

Like in the first illustrated embodiment shown in FIG. 1, in the embodiment of FIG. 2, collar 230 engages with cylinder head 240 to urge dual fuel connector 200 towards fuel injection valve 220 which is installed in bore 242. The embodiment of FIG. 2 uses a fluid tight seal between opposite sealing surfaces of dual fuel connector 200 and fuel injection valve 220 to define a seal between first fuel passage 204 and the passages associated with second fuel passage 206. A resilient seal such as o-ring 201 seals to prevent the second fuel from leaking through the gap between dual fuel connector 200 and fuel injection valve 220. Since the pressurized second fuel is on the left side of o-ring 201 in FIG. 2, the body of dual fuel connector 200 is formed with integrated collar 203 for holding o-ring 201 in place. Persons familiar with the sealing technology involved here will understand that with respect to this embodiment and other illustrated embodiments that employ o-rings, an o-ring is only one example of the type of resilient seal that can be employed to achieve the same result in substantially the same way. For example, a seal with a flange or with an oval, V or U shaped cross-section could be substituted for o-ring 201. An advantage of the arrangement shown in FIG. 2 is that, despite introducing a resilient seal, which introduces a part that could require servicing, it can be easier to manufacture components with only one fluid tight sealing surface between the fuel connector and the fuel injection valve, since less precision is required compared to a component with two sealing surfaces therebetween as required by the embodiment shown in FIG. 1.

Figure 3:
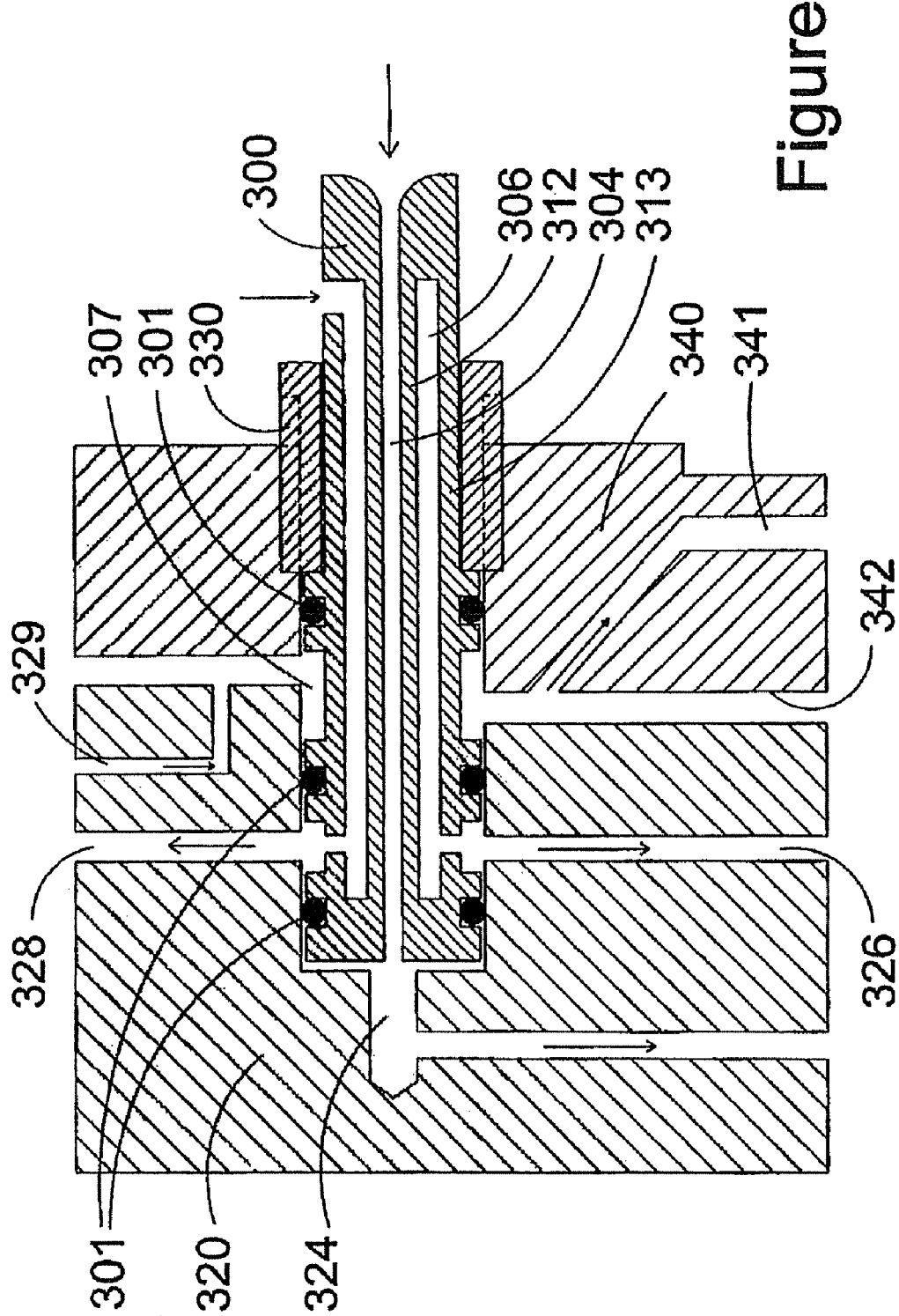
FIG. 3 is a schematic cross section view similar to that of FIGS. 1 and 2, but with third embodiment of a dual fuel connector.

With reference now to FIG. 3, dual fuel connector 300 is another embodiment of a dual fuel connector for separately supplying two different fuels to a fuel injection valve. Like in the other embodiments, first fuel passage 304 is a central bore through the center of dual fuel connector 300 which is aligned with first fuel inlet 324. Second fuel passage 306 is provided in an annular space separated from first fuel passage 304 by separating wall 312. Transverse openings in outer wall 313 connect second fuel passage 306 with second fuel inlet 326 and hydraulic fluid passage 328. Second fuel inlet 326 can lead to an accumulator chamber near the nozzle and hydraulic fluid passage 328 leads to a control chamber for a hydraulic actuator.

For hydraulically actuated fuel injection valves, drain passages are needed to collect and recover hydraulic fluid that is drained from the control chamber. Hydraulically actuated fuel injection valves work by controlling whether the control chamber is filled with high pressure hydraulic fluid or connected to a low pressure drain passage. Hydraulic actuators for fuel injection valves are well known, but with an injection valve that is supplied with two different fuels that are delivered separately, the additional piping needed for a hydraulic actuator can add to the piping complexity around the cylinder head, so there are advantages associated with arrangements that are able to use on of the fuels as the hydraulic fluid, and that provide means for simplifying the collection and recovery of low pressure fluid drained from the control chamber. The embodiment of FIG. 3 incorporates into dual fuel connector 300 an additional feature which is drain passage 307, which connects fuel injection valve drain passage 329 to cylinder head drain passage 341. As shown in FIG. 3, drain passage 307 is a cavity defined in part by a recessed portion formed in the body of dual fuel connector 300 and in part by the second bore through cylinder head 340. When the second fuel is employed as the hydraulic fluid, cylinder head drain passage 341 directs the low pressure second fuel to a collection system that returns the second fuel to a reservoir or to the suction piping for the delivery pump that pressurizes and supplies the second fuel to the fuel supply rail.

FIG. 3 shows an embodiment that does not use any metal-to-metal contact seals between the body of dual fuel connector 300 and the body of fuel injection valve 320. Instead, resilient ring seals such as o-ring 301 are used to seal against leakage between the separated fuel passages, and to the outside environment. The embodiment of FIG. 3 employs three o-rings 301 to achieve this result. With reference to FIG. 3, the ring seal that is furthest to the left seals between passages for the first fuel and the second fuel. The ring seal on the right hand side prevents drained hydraulic fluid, which can be the same as the second fuel, from leaking out of cylinder head 340. The middle seal is subjected to high pressure second fuel from the left hand side and relatively much lower drain pressure on the other side, so it is this middle seal that is the seal that is most likely to leak. However, with the disclosed arrangement, leakage of the second fuel past the middle seal is conveniently collected in the drain passages and recovered through cylinder head drain 341. Preferably the respective rail pressures of the first and second fuels are balanced to reduce the pressure differential across the ring seal on the left hand side. In preferred embodiments the second fuel is a liquid fuel, and to prevent leakage of the gaseous fuel, the rail pressure of the second fuel is kept slightly higher by a predetermined margin than the pressure of the first fuel. With well maintained seals and maintenance of the pressure differential within the predetermined margin, in preferred embodiments, leakage of the second fuel into the first fuel can be limited to a negligible amount.

Because ring seals are employed to seal between dual fuel connector 300 and fuel injection valve 320 and cylinder head 340, collar 330 is not needed to urge dual fuel connector 300 against fuel injection valve 320. In this embodiment collar 330 serves to retain dual fuel connector 300 in an installed location where the transverse openings are aligned with second fuel inlet 326 and hydraulic fluid passage 328. An advantage of embodiments that employ ring seals instead of metal-to-metal contact seals is that, because dual fuel connector 300 need not be urged against fuel injection valve 320 for sealing, dual fuel connector 300 does not need to be designed with the strength needed to resist buckling that might be caused by compressive forces imposed by collar 330. This means that dual fuel connector 300 need only be designed to withstand the pressures of the first and second fuels, which means that it can be made with less material so long as it remains structurally robust, which can reduce material costs in manufacturing. The need for less material and less structural strength can also help to make the dual fuel connector smaller, which can be helpful depending upon the size of the bore in which the dual fuel connector is to be installed.

As shown in FIG. 3, the transverse openings associated with second fuel passage 306 preferably have a larger opening than the fuel passages in fuel injection valve 320 that they are aligned with, to allow some leeway to reduce the needed precision and consequent cost associated with installation and manufacturing. Because compressive strength along the longitudinal axis is not needed, the transverse openings aligned with second fuel passage 326 and hydraulic fluid passage 328 can be formed by an annular groove that can be easier to manufacture and which can facilitate alignment during assembly.

Figure 4:
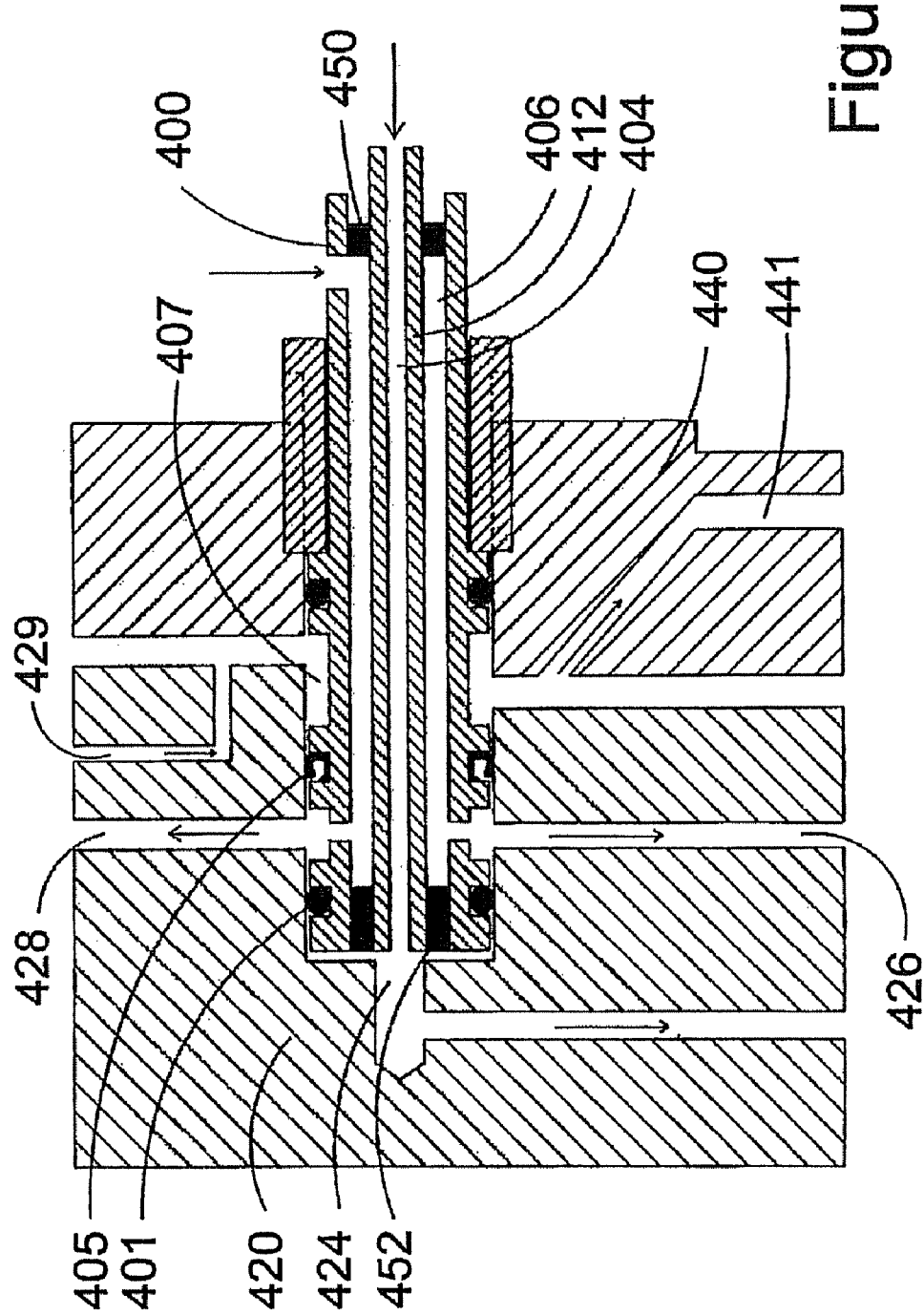
FIG. 4 is a schematic cross section view similar to that of FIGS. 1-3, but with a fourth embodiment of a dual fuel connector.

The embodiment shown in FIG. 4 is substantially the same in functionality as the embodiment shown in FIG. 3. That is, dual fuel connector 400 comprises a central bore that defines first fuel passage 404, second fuel passage 406 is defined by an annular cavity separated from first fuel passage 404 by separating wall 412, and a recessed portion of the body of dual fuel connector 400 defines in part drain passage 407. A difference with the embodiment of FIG. 4 is that the body of dual fuel connector 400 is formed from two pieces that are joined together by joints 450 and 452. Joints 450 and 452 can comprise, for example, metal or plastic plugs, adhesive connections, threaded connections, welded connections, and resilient seals.

To illustrate that other types of ring seals can be used, in FIG. 4, middle ring seal 405 comprises flanges to form a C shaped profile. The second fuel which is at a high pressure is on the left hand side of ring seal 405 so that high pressure fluid that fills interior of this seal between the flanges helps to push the flanges outwards, making a tighter seal. Employing such seals is well known when there is a high pressure differential across a ring seal. Such seals can also comprise springs for mechanically energizing the seal to assist the fluid pressure with urging the flanges away from each other for an even tighter seal. The seals on the left hand side and the right hand side are not subjected to such high pressure differential so less expensive o-ring seals such as seal 401 can be used at this location. Similarly, the seal on the right hand side only needs to contain the drained hydraulic fluid which is at a much lower pressure so an o-ring seal can be used at this location.

Figure 5:
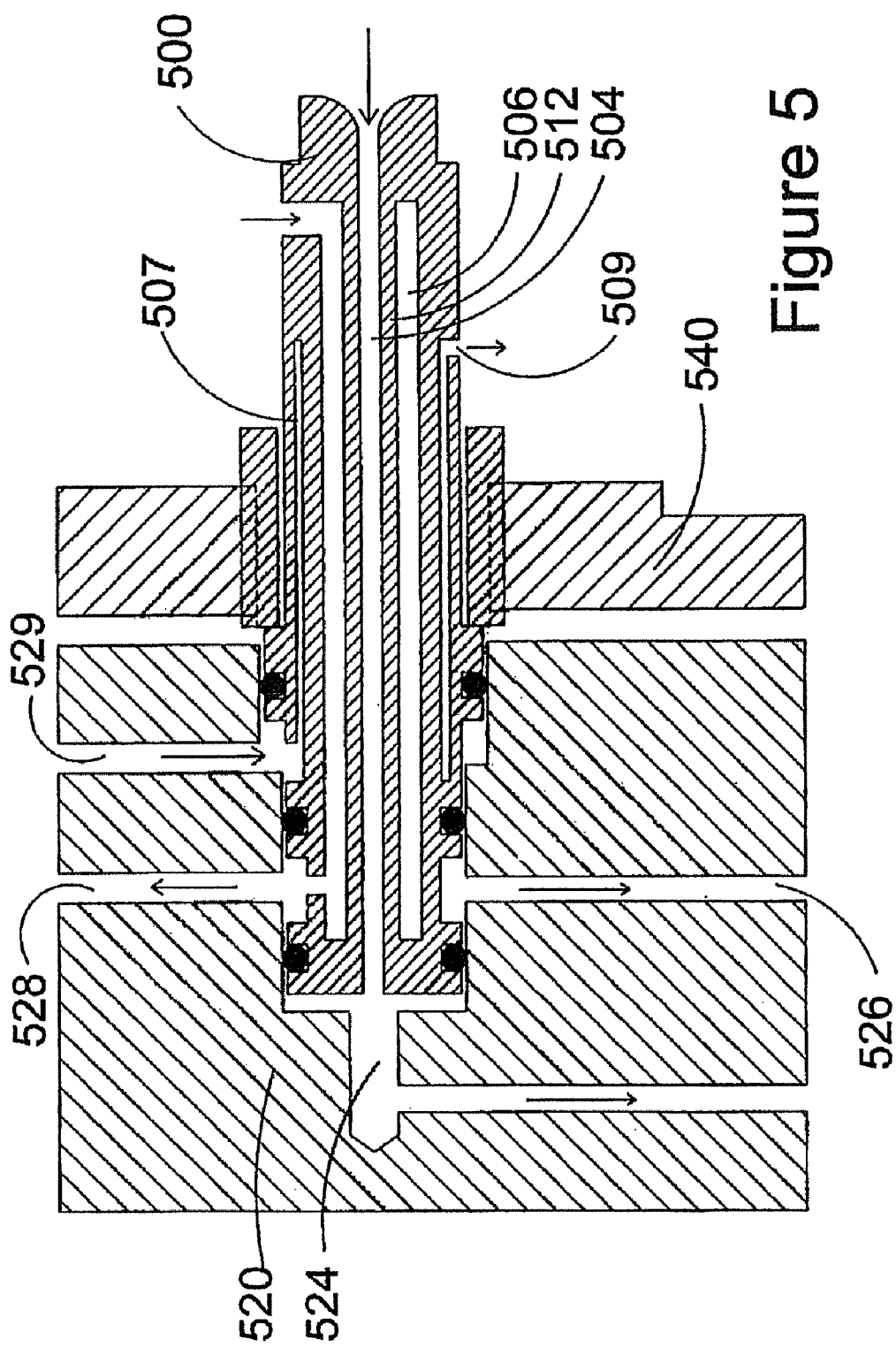
FIG. 5 is a schematic cross section view similar to that of FIGS. 1-4, but with a fifth embodiment of a dual fuel connector.

With reference now to FIG. 5, dual fuel connector 500 illustrates yet another embodiment of a dual fuel connector for separately supplying two different fuels to a fuel injection valve through one body. Dual fuel connector 500 comprises a body with a proximal end connectable to first fuel inlet 524 and second fuel inlet 526, whereby a first fuel delivered from a first fuel rail can be conveyed to first fuel inlet 524 via first fuel passage 504, and a second fuel from a second fuel rail can be conveyed to second fuel inlet 526 and hydraulic fluid passage 528 via second fuel passage 506. To keep the first fuel separate from the second fuel, separating wall 512 provides a boundary between first fuel passage 504 and second fuel passage 506. Like the embodiments illustrated in FIGS. 3 and 4, in the embodiment of FIG. 5, resilient seals are employed to provide a fluid tight seal at interfaces between dual fuel connector 500, fuel injection valve 520 and cylinder head 540. An additional feature of the embodiment illustrated in FIG. 5 is that hydraulic fluid received from injection valve drain passage 529 is collected in drain passage 507 which conveys the drained hydraulic fluid to drain outlet 509, which provides a connection point external to cylinder head 540. Accordingly, with this feature hydraulic fluid drain passages are not required within cylinder head 540.

In the embodiments of FIGS. 3-5 the resilient seals are shown disposed in grooves formed by raised surfaces on either side for retaining the resilient seals at the desired locations. Being resilient, the seals can be stretched to be installed in the grooves. When a resilient seal is positioned in a respective groove, it tries to return to its original shape, forming a tight fit at the bottom of the groove. When the dual fuel connector is installed in the second bore the resilient seals are compressed between the bottom of the groove and the opposite surface of cylinder head or fuel injection valve, as the case may be, to form a fluid tight seal therebetween.

A preferred embodiment of an elongated fuel connector has been described with the gaseous fuel delivered through a central bore and the liquid fuel delivered through passages in an annular space separated from the central bore by a wall. An advantage of this arrangement is that gaseous fuel that leaks from the central bore can be collected in the annular liquid fuel passage. Normally, in preferred embodiments, the pressure of the liquid fuel is kept higher than the pressure of the gaseous fuel, so it is more likely for leaks to occur in the opposite direction with the liquid fuel leaking into the gaseous fuel. In another embodiment, if the pressure of the liquid fuel is much higher than that of the gaseous fuel, it can be preferable to deliver the liquid fuel through the central bore and the gaseous fuel through the annular space. This is because, in this situation, delivering the higher pressure liquid fuel through the annular space would require the outer wall to be much stronger and thicker because the differential pressure between the liquid fuel and the ambient atmospheric pressure is much higher than the differential pressure between the liquid fuel and the gaseous fuel, even if the pressure of the gaseous fuel is much lower than that of the liquid fuel. That is, while the preferred embodiments described herein deliver gaseous fuel through the central bore and liquid fuel through an annular passage, there are embodiments contemplated herein where the opposite arrangement can be used, with liquid fuel delivered through the central bore and the gaseous fuel delivered through the annular space.

Figure 6:
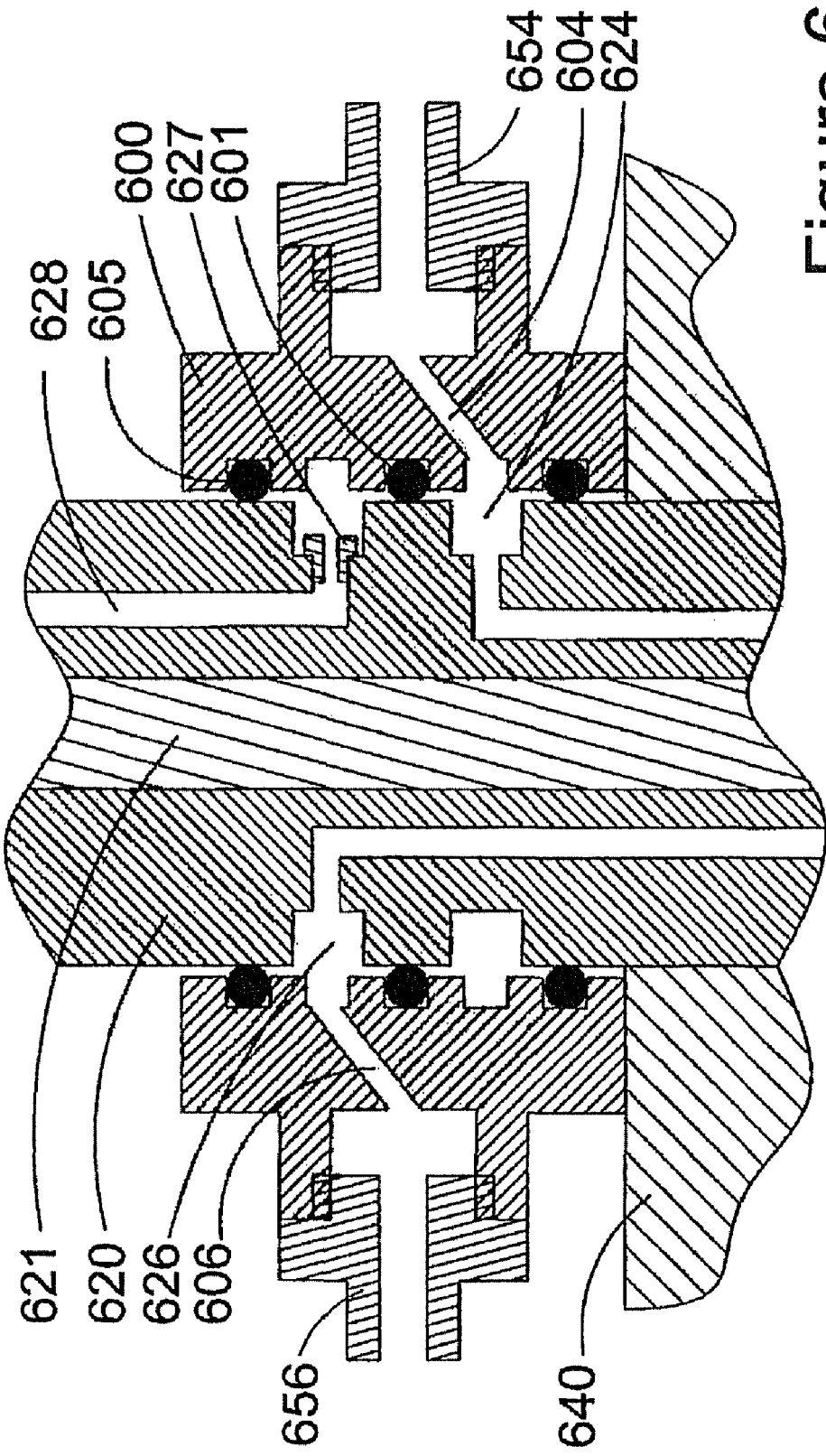
FIG. 6 is a schematic cross section view of the whole diameter of the fuel injection valve above the cylinder head, showing an embodiment of a ring-shaped dual fuel connector.
Figure 7:
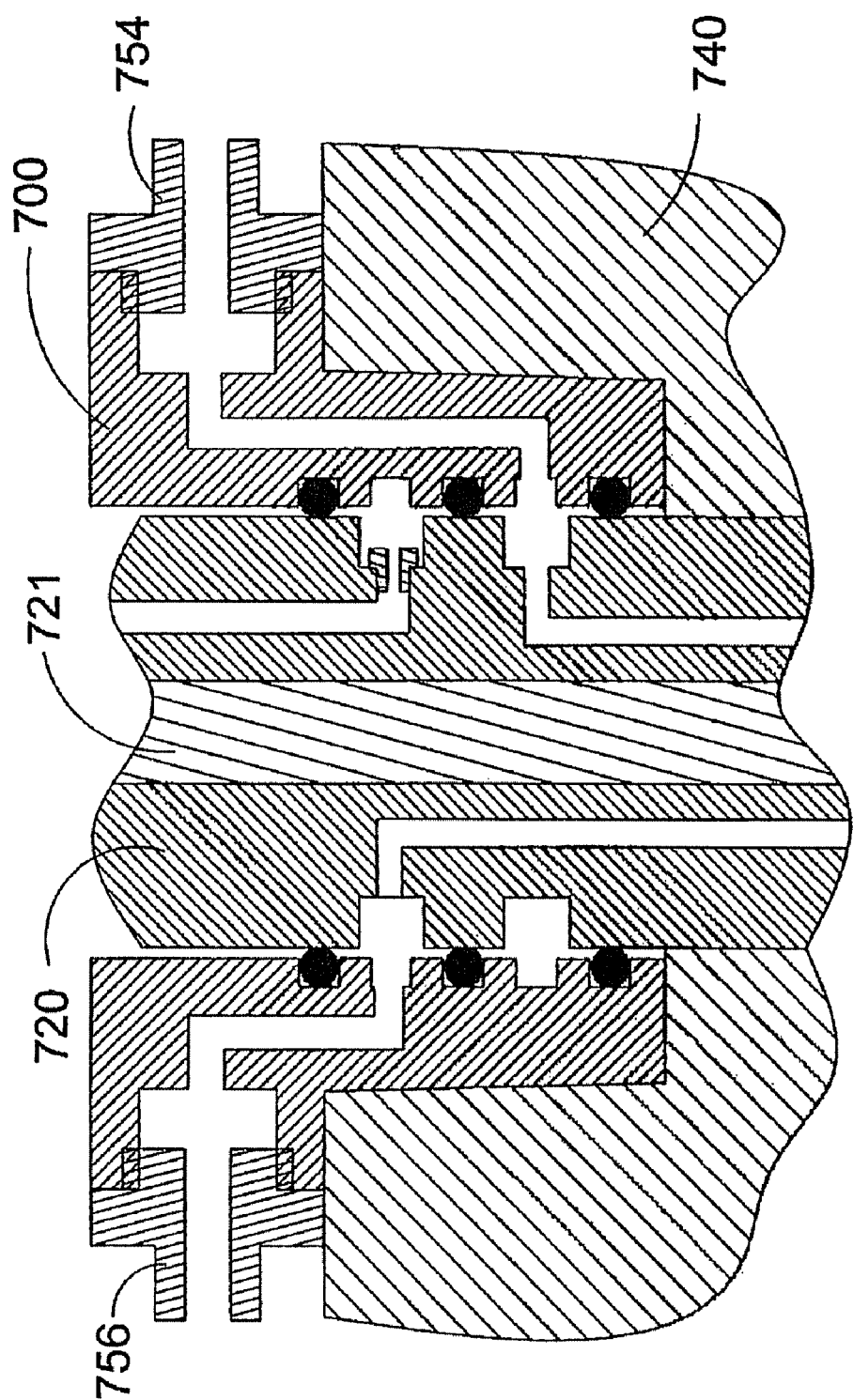
FIG. 7 is a schematic cross section view similar to that of FIG. 6, showing another embodiment of a ring-shaped dual fuel connector.

With reference now to FIGS. 6 and 7, a different type of arrangement for a dual fuel connector is illustrated, but like the other previously described embodiments, a dual fuel connector body is provided with fluidly separated passages for delivering two different fuels to a fuel injection valve, to separate fuel inlets into a fuel injection valve from separate fuel rails, with the dual fuel connector facilitating assembly and reducing the complexity of piping that might otherwise be required. Like in the other embodiments, schematic views are shown to illustrate the functionality of these arrangements in a single cross section view, but the physical arrangement can be different. For example the connections to the two fuel rails need not necessarily being opposite each other. That is, the orientations for the two connections to the fuel rails could be chosen to allow straighter piping from the fuel supply rails.

The arrangements shown in FIGS. 6 and 7 are suitable for engines with cylinder heads that are not made with bore holes that intersect with the fuel injection valve for receiving a fuel connector. Some engines are designed to use fuel injection valves that connect to the fuel rail above the cylinder head, but when such engines are adapted to be fuelled with two different fuels delivered separately to the fuel injection valve, the same problem is encountered with the need to simplify the piping from two fuel rails to the fuel injection valve in the limited space that is available around the fuel injection valve.

The embodiment shown in FIG. 6 shows dual fuel connector 600, which is ring-shaped and disposed around fuel injection valve 620 and above cylinder head 640. First fuel passage 604 fluidly connects first fuel rail 654 to first fuel inlet 624. In the illustrated embodiment the opening into first fuel inlet 624 can comprise an annular groove so to facilitate radial alignment between it and first fuel passage 604. Similarly, second fuel inlet 626 can comprise an annular groove to facilitate radial alignment with second fuel passage 606, which is in fluid communication with second fuel rail 656. If valve needle 621 is hydraulically actuated, and the second fuel is a liquid fuel, fuel injection valve 620 can further comprise hydraulic fluid passage 628 which is also in communication with the annular groove that forms part of second fuel inlet 626. Orifice 601 is located at the entrance into hydraulic fluid passage 628 where it can be easily installed and where it can control fluid flow rate into hydraulic fluid passage 628. Middle seal 601 provides a fluid tight seal between respective first and second fuel passages 604 and 606. In preferred embodiments, both of the fuels are delivered at injection pressure from common rail fuel systems but because there is fuel at pressure on both sides of middle seal 601, the differential pressure across this seal is much less than the fuel pressure, helping to reduce leakage that might occur. In the illustrated embodiment the second fuel is a liquid fuel which is also used as the hydraulic fluid that is delivered through hydraulic fluid passage 628 to a hydraulic actuator (not shown). The first fuel can be a gaseous fuel. To reduce the likelihood of gaseous fuel leaking from dual fuel connector 600, the liquid fuel delivered to second fuel passage 606 is preferably maintained at a higher pressure than the gaseous fuel that is delivered to first fuel passage 604. An advantage associated with locating the gaseous fuel in the lower position is that if gaseous fuel leaks past the lower resilient seal, there is also a face seal between dual fuel connector 600 and cylinder head 640. While not illustrated, a relief passage can be employed to collect gaseous fuel that leaks past the lower seal to prevent pressure from building below fuel injection valve 620. In this embodiment, in preferred embodiments, because the liquid fuel is delivered at a higher pressure than the gaseous fuel, upper seal 605 is exposed to the highest pressure differential, but seals for containing liquid fuels are well known. For example, a flanged seal with a U-shaped profile can be employed so that the high pressure liquid fuel can enter between the flanges and press them more firmly against the adjoining surfaces of fuel injection valve 620 and dual fuel connector 600.

FIG. 7 shows an embodiment that is similar to that of FIG. 6 except that part of dual fuel connector 700 can be recessed into an enlarged opening formed in cylinder head 740 where fuel injection valve 720 is mounted, instead of being entirely above the cylinder head as shown in FIG. 6. FIG. 7 shows valve needle 721 with its vertical longitudinal axis extending along the centerline of fuel injection valve 720. The illustrated internal features of fuel injection valve 720 and their respective functions are identical to those shown in FIG. 6 for fuel injection valve 600. The embodiment shown in FIG. 6 can be used if there are no spatial limitations on how much the fuel injection valve can extend above the cylinder head, but the embodiment shown in FIG. 7 can be employed if there are such spatial limitations. That is, with the embodiment shown in FIG. 7, dual fuel connector 700 need only protrude above cylinder head 740 far enough to allow space for connecting to first fuel rail 754 and second fuel rail 756. First fuel rail 754 and second fuel rail 756 are shown connecting to dual fuel connector 700 horizontally, but the connections can be oriented to meet the fuel rails on an angle or even vertically depending upon where the fuel rails are located.

In all of the embodiments, the dual fuel connector provides a body that joins internal fluid passages within the fuel injection valve with two fuel rails, reducing the complexity that would otherwise be introduced by separate connections between each fuel rail and the injection valve. All embodiments allow two different fuels to be delivered separately to fluidly isolated fuel passages within the fuel injection valve so that the fuels can be mixed within the fuel injection valve or injected separately into the combustion chamber, depending upon the design of the fuel injection valve. Depending again upon the design of the fuel injection valve, this arrangement allows greater flexibility in controlling the proportion of the two fuels delivered to the combustion chamber and in the timing for introducing each of the two fuels into the combustion chamber. Another advantage of all of the embodiments of the disclosed dual fuel connector is that they each facilitate installation and maintenance of the fuel injection valves because with each embodiment the fuel injection valve can be removed without undoing the connection between the fuel rails and the dual fuel connector. In some embodiments it might be necessary to at least partly remove the dual fuel connector before removing the fuel injection valve, but a further advantage of the embodiments shown in FIGS. 6 and 7, is that even this is not necessary.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A dual fuel connector for separately supplying two different fuels to a fuel injection valve, said two different fuels comprising a first fuel that is supplied to a first fuel inlet into the fuel injection valve and a second fuel that is supplied to a second fuel inlet into the fuel injection valve, the dual fuel connector comprising:
    (a) a body, separate from the fuel injection valve, with separate fluid connections to the first fuel inlet, the second fuel inlet, a first fuel rail and a second fuel rail;
    (b) a first fuel passage within the body in fluid communication with the first fuel rail and the first fuel inlet; and
    (c) a second fuel passage within the body in fluid communication with the second fuel rail and the second fuel inlet,
    wherein the first fuel passage is fluidly isolated from the second fuel passage.

2. The dual fuel connector of claim 1 wherein the body is elongated with a proximal end associated with the fuel injection valve and a distal end associated with the first and second fuel rails.

3. The dual fuel connector of claim 2 wherein the body is mountable in a first bore provided in the cylinder head that intersects with a second bore provided in a cylinder head in which the fuel injection valve is mountable.

4. The dual fuel connector of claim 2 wherein the body comprises a central bore that defines the first fuel passage and the second fuel passage is defined by an annular space around the central bore with a wall separating the first and second fluid passages.

5. The dual fuel connector of claim 4 wherein the wall separating the first and second fluid passages is tubular.

6. The dual fuel connector of claim 4 wherein the wall separating the first and second fluid passages has a thickness that is selected to withstand differential pressures between the first fuel and the second fuel without rupturing or deflecting to a degree that the flow of the first or second fuels is affected, and further wherein the thickness of the wall is less than what is needed to withstand rupture against a designed maximum gauge pressure of the second fuel.

7. The dual fuel connector of claim 1 wherein the first fuel is a gaseous fuel.

8. The dual fuel connector of claim 7 wherein the second fuel is a liquid fuel.

9. The dual fuel connector of claim 8 further comprising an opening between the second fuel passage and a hydraulic fluid passage within the fuel injection valve that communicates with a control chamber of a hydraulic actuator.

10. The dual fuel connector of claim 2 wherein the proximal end of the body comprises a seating surface that is contactable with an opposing metal seat provided on the fuel injection valve to form a fluid tight seal when the body is urged against the fuel injection valve.

11. The dual fuel connector of claim 10 wherein the fluid tight seal defines a boundary between the first fuel inlet and the second fuel inlet.

12. The dual fuel connector of claim 10 wherein the seating surface of the proximal end of the body is shaped to be semi-spherical or semi-spheroidal.

13. The dual fuel connector of claim 10 wherein the metal seat on the fuel injection valve is conically shaped.

14. The dual fuel connector of claim 1 further comprising resilient ring seal members positioned between the body and opposing surfaces associated with the fuel injection valve.

15. The dual fuel connector of claim 3 further comprising resilient ring seal members positioned between the body and opposing surfaces of the cylinder head.

16. The dual fuel connector of claim 1 further comprising a drain passage disposed within the body with the drain passage in fluid communication with a drain outlet from the fuel injection valve and a drain line, wherein the drain passage is fluidly isolated from the first and second fuel passages.

17. The dual fuel connector of claim 1 wherein the body is shaped to fit around the fuel injection valve above a cylinder head.

18. A method of separately supplying a first fuel and a different second fuel to a fuel injection valve, the method comprising conveying the first and second fuels from separate fuel rails to a first fuel inlet and to a second fuel inlet of the fuel injection valve through fluidly isolated first and second fuel passages provided within a body of a dual fuel connector that is separate from the fuel injection valve.

19. The method of claim 18 further comprising:
controlling pressures of the first and second fuels so that a pressure differential therebetween within the body is kept below a predetermined value;
disposing a wall that separates the first fuel passage from the second fuel passage strong enough to withstand the pressure differential without rupturing or deflecting to a degree that flow of the first or second fuels is affected, the wall having a strength that is less than the strength needed to withstand the designed maximum gauge pressure of either one of the first and second fuels.

20. The method of claim 19 wherein the first fuel is a gaseous fuel and the second fuel is a liquid fuel and the pressure differential between the first fuel and the second fuel is maintained so that when the two fuels are being supplied to the fuel injection valve, the second fuel is at a higher pressure than the first fuel.

21. The method of claim 18 wherein the second fuel is a liquid fuel and the method further comprises hydraulically actuating the fuel injection valve and using the liquid fuel as hydraulic fluid in a control chamber associated with a valve needle and draining the liquid fuel from the control chamber through a drain passage defined at least in part by the body of the dual fuel connector.

22. A method of installing a dual fuel connector that comprises a body with a first fuel passage through which a first fuel can be conveyed from a first fuel rail to a first fuel inlet into a fuel injection valve, and a second fuel passage through which a second fuel can be separately conveyed from a second fuel rail to a second fuel inlet into the fuel injection valve, the method comprising:
inserting a proximal end of the body into an opening in a cylinder head and:
aligning a first opening in the proximal end that is in communication with the first fuel passage with the first fuel inlet and providing a fluidly sealed connection thereto; and
aligning a second opening in the proximal end that is in communication with second fuel passage with the second fuel inlet and providing a fluidly sealed connection thereto; and
at a distal end of the body, connecting the first fuel passage to the first fuel rail and the second fuel passage to the second fuel rail.

23. The method of claim 22 wherein the first fuel is a gaseous fuel and the second fuel is a liquid fuel.

24. A method of installing a dual fuel connector that comprises a body with a first fuel passage through which a first fuel can be conveyed from a first fuel rail to a first fuel inlet into a fuel injection valve, and a second fuel passage through which a second fuel can be separately conveyed from a second fuel rail to a second fuel inlet into the fuel injection valve, the method comprising:
placing the body on top of the cylinder head with an opening through the body aligned with a bore into which the fuel injection valve is mountable;
mounting the injection valve in the bore by inserting it through the body and aligning a first opening in the body that is in communication with the first fuel passage with the first fuel inlet and providing a fluidly sealed connection thereto, and aligning a second opening in the body that is in communication with the second fuel passage with the second fuel inlet and providing a fluidly sealed connection thereto:
connecting the first fuel passage to the first fuel rail; and
connecting the second fuel passage to the second fuel rail.

25. The method of claim 23 wherein the first fuel is a gaseous fuel and the second fuel is a liquid fuel.

* * * * *